United States Patent Office 2,698,750
Patented Jan. 4, 1955

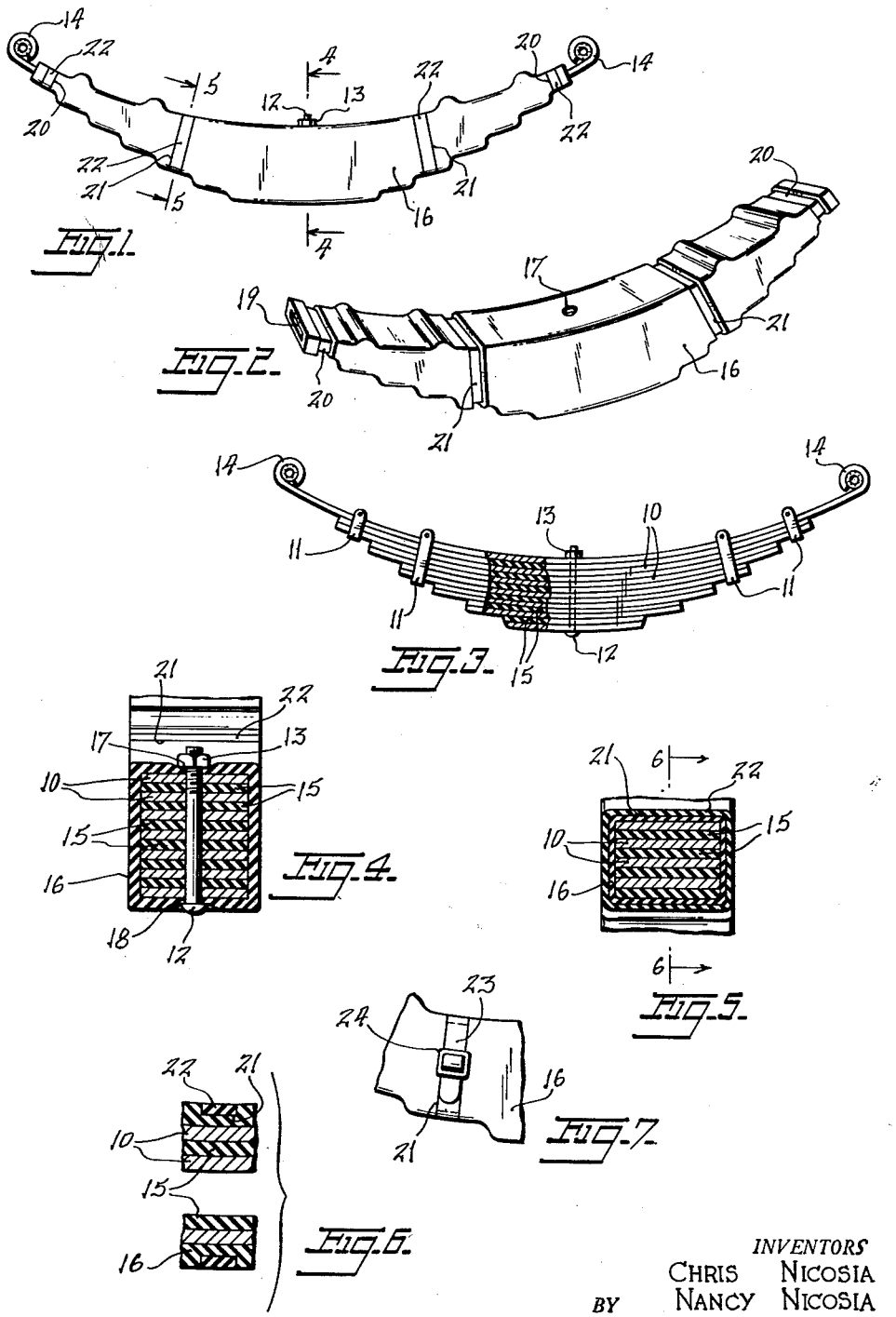

2,698,750

RUST-PROOFED AUTOMOBILE SPRING

Chris Nicosia and Nancy Nicosia, Jackson Heights, N. Y.

Application April 28, 1952, Serial No. 284,708

2 Claims. (Cl. 267—37)

This invention relates to new and useful improvements in spring supported vehicles and more particularly to protective means for the supporting springs.

Leaf springs of the type which are utilized to support motor and other vehicles are located adjacent the wheels and beneath the body of the vehicle and those are constantly exposed to dust, dirt, water, snow, ice and other harmful matter thrown off the rotating wheels. The result of this is that the springs require frequent lubrication not only to eliminate annoying squeaking which develops therein but also to suppress, as far as possible, harmful oxidation thereof.

The principal object of the invention is the provision of means for protecting vehicle springs from the ravages of matter thrown off the rotating wheels of the vehicle and therefore to eliminate the need of lubrication thereof; because of the covering, the springs need no lubrication.

Another object of the invention is to construct said means in such manner that the same also protects the springs against the ravages of airborne moisture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a spring having the cover of the invention applied thereto.

Fig. 2 is a perspective view of the cover of the invention.

Fig. 3 is an elevational view of the spring with the cover removed.

Fig. 4 is an enlarged sectional view on line 4—4 of Fig. 1.

Fig. 5 is a sectional view on line 5—5 of Fig. 1.

Fig. 6 is a fragmentary sectional view on line 6—6 of Fig. 5.

Fig. 7 is a fragmentary view of a portion of Fig. 1 but illustrates a slightly modified construction.

Referring first to Fig. 3, the vehicle spring to which the means of the invention are applied comprises a plurality of slightly arcuate leaves 10 of graduated sizes which are secured together in contiguous relationship by means of shackles 11 and a bolt 12 which passes through the centers thereof and is provided with a nut 13. Usually bolt 12 serves to secure the spring to the axle or the like of the vehicle. The longest leaf 10 of the spring is provided with loops 14 by which the spring is secured to the frame of a vehicle. In order to decrease the friction occasioned by relative sliding movements of the leaves 10 as the spring is flexed a strip or layer 15 of rubber impregnated with asbestos fibres is positioned between each pair of contiguous leaves 10. Evident the inclusion of the layers 14 eliminates the need for lubrication adapted to relieve such friction. No cement or the like is required to secure the layers 15 between the leaves 10 as the shackles 11 and the bolt 12 are sufficient to prevent displacement thereof, see also Fig. 4. Instead of rubber, the strips 15 may be made of suitable plastic or similar non-corrosive yielding material.

In order to encase the spring and thus prevent moisture and dust and other harmful substances from contacting the same, the means shown in Figs. 2, 3, 4, 5 and 6 are provided. As shown, said means include a sheath 16 of elastic material such as rubber impregnated with asbestos, which has substantially the same configuration as the spring. As shown, sheath 16 is engaged on the spring and encases all of the same save the loops 14 at the ends of the longest leaf 10 to this end, the material of the sheath must be sufficiently elastic to permit sufficient stretching, for the thick central portion of the spring to pass through one of the narrow end openings 19 thereof. Preferably, the sheath has a tight fit on the spring.

In order to accommodate the bolt 12 sheath 16 is provided with upper and lower holes 17 and 18 at the center thereof. As best shown in Fig. 4, the head of bolt 12, and nut 13 seal the holes 17 and 18 when the the latter is drawn upon the bolt, and effectively prevent the entry of moisture and dust etc., through the holes.

In order to seal the ends of sheath 16 and also to prevent any slipping about of the sheath on the spring, the latter is provided with peripheral grooves 20 adjacent the ends thereof and also with grooves 21 positioned closer to the center of the sheath and equidistant from the adjacent grooves 20. Adapted to the grooves 20 and 21 are elastic bands 22 which fit into the grooves only when stretched and which therefore further tighten the sheath against the spring, see Figs. 1 and 6.

Evidently, therefore the spring is sealed within the sheath and is not subject to the adverse influence of moisture and dust and the like.

Referring now to Fig. 7, wherein like parts are given the same reference numerals as hereinabove with a prime added, the elastic bands 22 described above are replaced each by a belt 23 having a buckle 24 by which the belt can be tightened to hold the sheath 16′ tightly against the spring housed therein. In this form of the invention the sealing pressure is adjustable to meet varying conditions.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. In a spring of the class described, a series of parallel leaves of graduated lengths and which include a layer of asbestos-impregnated rubber between each pair of said leaves, an elastic sheath encasing said spring, a transverse groove in said sheath, an elastic band within said groove, the upper edge of said band and groove terminating at the same height to provide a dust free surface, upper and lower holes in said sheath at the center thereof, and a bolt extending through said holes.

2. In a spring of the class described, a series of parallel leaves of graduated lengths and which include a layer of asbestos-impregnated rubber between each pair of said leaves, an elastic sheath encasing said spring, a transverse groove in said sheath, an elastic band within said groove, the upper edge of said band and groove terminating at the same height to provide a dust free surface, upper and lower holes in said sheath at the center thereof, and a bolt extending through said holes, said sheath including peripheral grooves adjacent the ends thereof, and a belt including a buckle in each said grooves whereby the belt can be tightened to hold the sheath tightly against the spring housed therein.

References Cited in the file of this patent

UNITED STATES PATENTS

| | | |
|---|---|---|
| 1,713,611 | Little | May 21, 1929 |
| 1,990,802 | Thompson | Feb. 12, 1935 |
| 2,052,930 | Laursen | Sept. 1, 1936 |